United States Patent
Schüssler

[11] Patent Number: 5,183,595
[45] Date of Patent: Feb. 2, 1993

[54] DEVICE FOR GASSING LIQUIDS

[76] Inventor: Karl H. Schüssler, Philipp-Reis-Str. 18, 6460 Gelnhausen, Fed. Rep. of Germany

[21] Appl. No.: 807,012

[22] Filed: Dec. 9, 1991

Related U.S. Application Data

[63] Continuation-in-part of Ser. No. 522,124, May 11, 1990, abandoned.

[30] Foreign Application Priority Data

Apr. 20, 1990 [DE] Fed. Rep. of Germany ....... 4012631

[51] Int. Cl.$^5$ .............................. B01F 3/04; B01F 5/04
[52] U.S. Cl. ................................. 261/64.3; 261/122.1; 261/122.2
[58] Field of Search ................ 261/122, 64.3; 285/192

[56] References Cited

U.S. PATENT DOCUMENTS

| | | | |
|---|---|---|---|
| 1,873,843 | 8/1932 | MacDonald | 261/122 |
| 1,885,785 | 11/1932 | Thomson | 261/122 |
| 2,255,438 | 9/1941 | Robinson | 261/122 |
| 2,551,871 | 5/1951 | Briggs, Jr. | 285/192 |
| 3,032,311 | 6/1962 | Brinkman | 251/351 |
| 3,598,315 | 8/1971 | Seymour | 261/122 |
| 3,642,452 | 2/1972 | Roget et al. | 261/122 |
| 3,746,323 | 7/1973 | Buffington | 261/122 |
| 3,761,116 | 9/1973 | Scheitlin et al. | 285/192 |
| 3,841,997 | 10/1974 | McGee | 261/122 |
| 3,956,432 | 5/1976 | Hilling | 261/122 |
| 3,997,634 | 12/1976 | Downs | 261/122 |
| 4,557,879 | 12/1985 | Weber | 261/122 |
| 4,640,803 | 2/1987 | Klaus-Peter et al. | 261/122 |
| 4,764,314 | 8/1988 | Schneider | 261/122 |
| 4,848,749 | 7/1989 | Schneider | 261/122 |
| 4,954,296 | 9/1990 | Ott | 261/122 |

FOREIGN PATENT DOCUMENTS

| | | | |
|---|---|---|---|
| 507294 | 1/1931 | Fed. Rep. of Germany . | |
| 576213 | 5/1933 | Fed. Rep. of Germany | 261/122 |
| 2261994 | 12/1972 | Fed. Rep. of Germany . | |
| 3124233 | 1/1983 | Fed. Rep. of Germany | 261/122 |
| 2411160 | 7/1979 | France | 261/122 |
| 1331836 | 8/1987 | U.S.S.R. | 261/122 |

Primary Examiner—Tim Miles
Attorney, Agent, or Firm—Wenderoth, Lind & Ponack

[57] ABSTRACT

A device for gassing liquids, in particular for aerating waste water, includes a gas distributor that can be connected to a gas supply device, that is to be arranged below the liquid level and that has at least one membrane-like wall made of a flexible material with a plurality of gas discharge openings. The wall is designed as a support-free bubble member that is held only by at least one gas supply fitting and is closed, except for such at least one gas supply opening and the gas discharge openings.

47 Claims, 8 Drawing Sheets

DEVICE FOR GASSING LIQUIDS

This is a continuation-in-part of application Ser. No. 07/522,124 filed May 11, 1990, now abandoned.

BACKGROUND OF THE INVENTION

The invention relates to a device for gassing liquids, in particular for aerating waste water, by means of a gas distributor that can be connected to a gas supply device, that is to be arranged below the liquid level and that has at least one membrane-like wall made of a flexible material with a plurality of gas discharge openings.

Such a device for fine bubble aeration of waste water is known from DE-OS 22 61 994. An air hose that is made of an elastic material, attached at one end to an air supply line and closed at the other end, is provided with a non-perforated bottom side and an upper side provided with a plurality of air discharge openings. The air hose is held at its longitudinal borders by a carrier member, and a membrane, which is under the tension of an air cushion and which is formed defining an air channel attached to the air supply line, is arranged in the air hose. The two hose walls are connected to one another on two longitudinal borders by a welding seam and form a loop which envelops one of two strand-shaped carrier members. The membrane which is under the tension of an air cushion is also welded on its two side borders with the two hose walls. Furthermore, the air hose is braced at its two side borders by a structural steel plate, which covers the welding seams and is supposed to prevent their peeling off. The rigidity and the weight of the air hose is increased by the structural steel plate. It can also be provided on the bottom side of the air hose, the weight being designed preferably somewhat greater than the buoyancy of the hose filled with air. This known aeration device is time consuming to build and, therefore, expensive.

A device for aerating liquids through compressed air pipe systems is known from DE-PS 507 294. In this device, air supply pipes made of perforated metallic or other suitable material are enveloped by rubber sleeves which have fine perforations that do not open until under the pressure of the air fed into the air pipe system. In this manner the possibility of fine aeration and the provision of a valve effect when the air flow is turned off is to be achieved. The rubber sleeves involve a special cost for their support, i.e. of the overall jet pipe system. In addition, the replacement of worn or defective rubber sleeves is very time-consuming.

A special support structure for a membrane is also deemed necessary according to the proposal of DE-PS 34 10 267. In this known gassing device, a foundation, which has at least one inlet for the gas, is provided. The membrane covers the foundation and is fastened thereto. Furthermore, a device to limit the lift of the membrane is fastened to the foundation. The inlet for the gas is guided as the passage opening through the foundation. The lifting device comprises a connection which is fastened at one end thereof to the membrane in the covering region of the passage opening and at another end thereof with a counterpart arranged in the region of the passage opening. Here too, there are many parts to be assembled, a state that makes the gassing device expensive with respect to time and material cost.

SUMMARY OF THE INVENTION

With the above discussion in mind, the object of the present invention is to eliminate the above drawbacks and in particular to provide a gassing device that can be assembled with greater ease and with less material cost while retaining the same or better capability and, therefore that can be built and repaired more cost-efficiently.

This object is achieved substantially by the invention in that a membrane-like wall is designed as and incorporated into a support-free bubble assembly which is held only by means of at least one gas supply fitting and is closed, except for such at least one gas supply opening and gas discharge openings in the wall.

Therefore, the solution of the invention makes do without any inner and outer support structure. The gas distributor needs in principle to comprise only the bubble assembly itself. The bubble assembly can be held inherently stable merely by admitting therein a small quantity of gas.

In an especially advantageous embodiment of the invention, the gas discharge openings are substantially distributed, preferably uniformly, over the entire surface of the wall of the bubble assembly in order to ensure a uniform supply of gas into the liquid.

Preferably, the wall of the bubble assembly assumes under the gas pressure a predefined shape. However, it is also possible to hold the wall in a predefined shape by means of horizontal and/or vertical, rib-shaped thickenings so that gas admission is not absolutely necessary during periods of shutdown.

According to another feature of the invention, the effective opening cross-section of the gas discharge openings may be of different sizes, in adaptation to the liquid pressure to be overcome by the gas exiting through the gas discharge openings. To achieve, for example, a uniform discharge of gas over an entire wall or membrane surface, the cross-section of the gas discharge openings in the bubble wall decreases from the bottom to the top to the degree to which the liquid pressure decreases from the bottom to the top as a function of the vertical height of the bubble wall.

A uniform discharge of gas also can be achieved by varying the thickness of the bubble wall in adaptation to the liquid pressure to be overcome by the gas exiting through the gas discharge openings. To this end, the bubble wall in the bottom region of the bubble assembly is, for example, not as thick as in the upper region, so that the gas passing through the gas discharge openings in the bottom region of the bubble wall meets with less flow resistance through the bubble wall than in the upper region thereof. Thus, the pressure to be overcome on the whole by the exiting gas is approximately uniform over the entire bubble wall.

The bubble wall can be made of an expandable, for example flexible rubber, material which assumes the desired shape and size with the admission of the pressure required for the gassing operation. However, it is also possible that the bubble wall be made of a non-expandable, for example textile, material. In such case, the bubble pressure is pressure independent, above a minimum pressure, of the gas admission size and shape. However, it is also possible, if the textile material permits a certain expansion, to combine the properties of an expandable material with those of a non-expandable material. This can be achieved in particular by providing that the bubble wall is made of a textile material or has a textile reinforcement insert or overlay.

Furthermore, it is within the scope of the invention if the gas discharge openings are formed in a pre-stressed bubble wall made of expandable material. In this case the gas discharge openings are closed without pressure admission, whereas they do not open until the gas admission pressure rises to a minimum level. Within a certain pressure range the opening cross-section of the gas discharge openings is a function of the pressure and can be adjusted correspondingly.

If a pressure-independent opening cross-section of the gas discharge openings is desired, they are inserted preferably into a non-prestressed bubble wall. Then the openings have substantially the same cross-section before and during the admission of gas, independently of the gas pressure.

Another feature of the invention provides that the gas discharge openings have an opening cross-section that increases from the inside to the outside, i.e. radially. That is the openings are designed conically. This has the advantage that, when the gas leaves the bubble assembly, any dirt deposits from the gas discharge openings are readily dragged along and in this manner the risk of clogging of even relatively small gas discharge openings is reduced. Such gas discharge openings are perforations formed by needle pricks, for example, from the outside into the bubble wall.

An especially simple arrangement is provided when the bubble assembly has a gas supply fitting that is slipped onto a socket of the gas supply device, such a bubble assembly readily can be exchanged for a defective one. For safety, the gas supply fitting can be firmly fastened to the socket by means of a clamping ring so that even greater pressure admissions can be overcome.

In another embodiment the bubble assembly has a gas supply fitting with a bead or flange that can be buttoned or snapped over and into a gas supply opening of the gas supply device. This also permits a relatively simple mounting and dismounting of the bubble assembly. Also, the gas supply fitting with the bead can be designed as one piece with a bubble assembly that is also one piece.

However, it is also possible that the bubble assembly be made of multiple parts or several wall segments that are vulcanized together, welded together and/or cemented together, sewn together and/or connected by means of, e.g., an annular shaping element, slide fastener, clamp or the like.

To counteract the buoyancy of the gassing device when the bubble assembly is filled, it is proposed with the invention that the bubble assembly envelop a ballast weight spaced inwardly at a distance from the bubble wall. The ballast weight can be designed as a hollow body made of a rigid or flexible material whose interior is flow-connected to the liquid surrounding the bubble wall and/or can be filled with liquid or material such as water, cement, lead or the like as ballast weight. However, the ballast weight can also be arranged outside the bubble assembly.

Furthermore, a nonreturn valve, which prevents the liquid from penetrating into the socket or the piping system of the gas supply device, can be arranged as a flap or ball valve in the socket and/or gas supply opening.

The bubble assembly has a configuration such that the bubble member has a shape substantially of a sphere, a flattened off-sphere, a horizontally extending ring or torroid, or an annular member. An additional and very unique advantage is achieved in accordance with those embodiments of the present invention wherein the bubble member or bubble assembly is in the shape of a ring or a torroid or is annularly shaped. Particularly, the present inventor has discovered that the use of this type of configuration, in conjunction with the other structural features of the present invention, provides an especially effective aeration of the liquid by the gas. The precise reason for this improved aeration is not entirely understood. However, it is believed that the discharge upwardly of gas bubbles from the entire surface of a torroidal or annular shaped bubble member creates a bubble flow under circumstances that generate a downward flow of liquid through the torroidal or annular shaped bubble member. This, it is believed, causes a greater gas-liquid exchange, with the result of a more thorough and efficient aeration of the liquid. It particularly is believed that the flow of bubbles upwardly from the entire surface of such shaped bubble member causes the cross section of the bubbles as they move upwardly to enlarge and that this in turn causes or is caused by a downward flow of liquid through the annular or torroidal shaped bubble member. Particularly, when the bubble member is in the form of a membrane-like cylindrical wall that is disposed with the axis thereof extending vertically, there appear to be achieved especially advantageous results. In such an arrangement the gas bubbles leave the vertical cylindrical wall throughout the entire surface thereof in directions horizontally. As a result, the period of dwell of the gas bubbles and consequently the gassing effect are increased compared with gas bubbles leaving an inclined surface or a horizontal surface in a direction upwardly. Also, in such an arrangement having a vertically aligned inner liquid channel, there is obtained an increased downward flow of liquid through such channel. The reason appears to be that the liquid around the surface of the cylindrical wall has a higher concentration of gas bubbles than the liquid in the liquid channel. Thus, it appears that the specific gravity around the device is less than that of the liquid within the channel. This leads to the effect that the liquid around the device flows upwardly whereas the liquid in the middle of the device, i.e. in the channel, flows downwardly. Accordingly, there is achieved enhanced circulation and therefore an enhanced gassing effect.

BRIEF DESCRIPTION OF THE DRAWINGS

The following description of embodiments of the invention, with reference to the accompanying drawings, emphasizes other goals, advantages, and possible applications of the present invention. All described or illustrated features form by themselves or in any arbitrary logical combination the subject matter of the invention, independently of the claims.

DETAILED DESCRIPTION OF THE INVENTION

The device shown in FIG. 1 to gas liquids comprises a gas distributor which is in the form of a bubble assembly including a bubble member 4 defining an inflatable chamber and to be arranged below the liquid level and which can be attached to a gas supply device 7. Gas supply device 7 includes a pipe line 15 from which branch off one or more sockets 6 each defining a gas supply opening 9. Bubble member 4 is formed by a membrane-like bubble wall 5 made of flexible material with a plurality of gas discharge openings 1 which are distributed substantially uniformly over the entire membrane surface (only a portion is shown). Bubble member 4 is held, in any event in the pressure-loaded state, spherically and without any additional support merely via a gas supply fitting 2 thereof, which is slipped over the socket 6 and is firmly held by means of a screw shackle or clamp 12. In socket 6 there is, upstream of a gas supply opening 3 in the bubble wall 5, a nonreturn valve 14 designed as a ball valve which opens with an increase in gas pressure and closes with a decrease in pressure so that no liquid can pass through the gas discharge openings 1 into bubble 4 and gas supply device 7.

Figure 1:
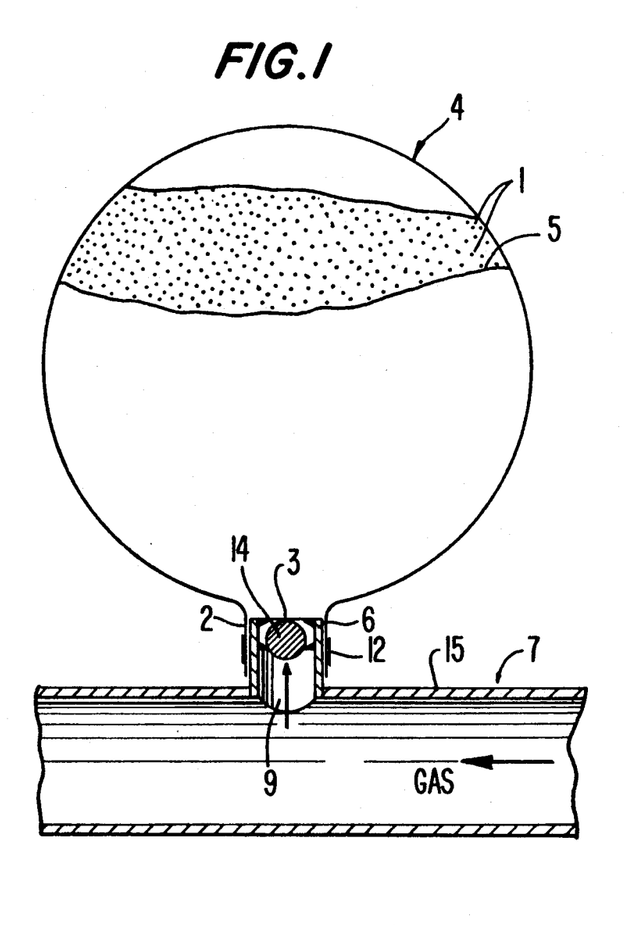
FIG. 1 is a schematic sectional view of a gassing device according to a first embodiment of the invention.
Figure 2:
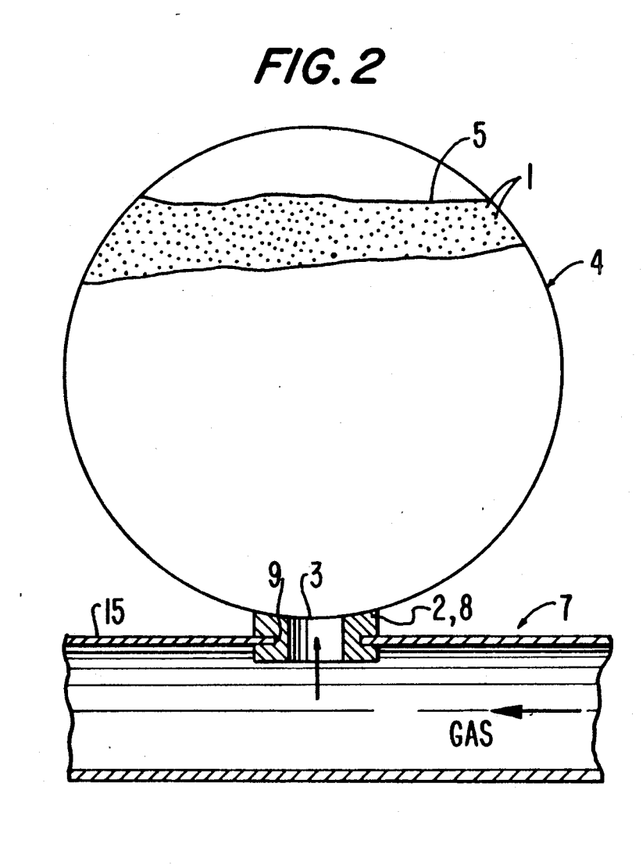
FIGS. 2 to 7 are sectional views similar to FIG. 1 of other embodiments of the invention.

The major distinction between the embodiment of FIG. 2 and that of FIG. 1 is that the gas supply fitting 2 attached to gas supply opening 3 of bubble wall 5 is designed as a bead or flange 8, which can be buttoned or snapped over and into gas supply opening 9 of pipe line 15.

Figure 3:
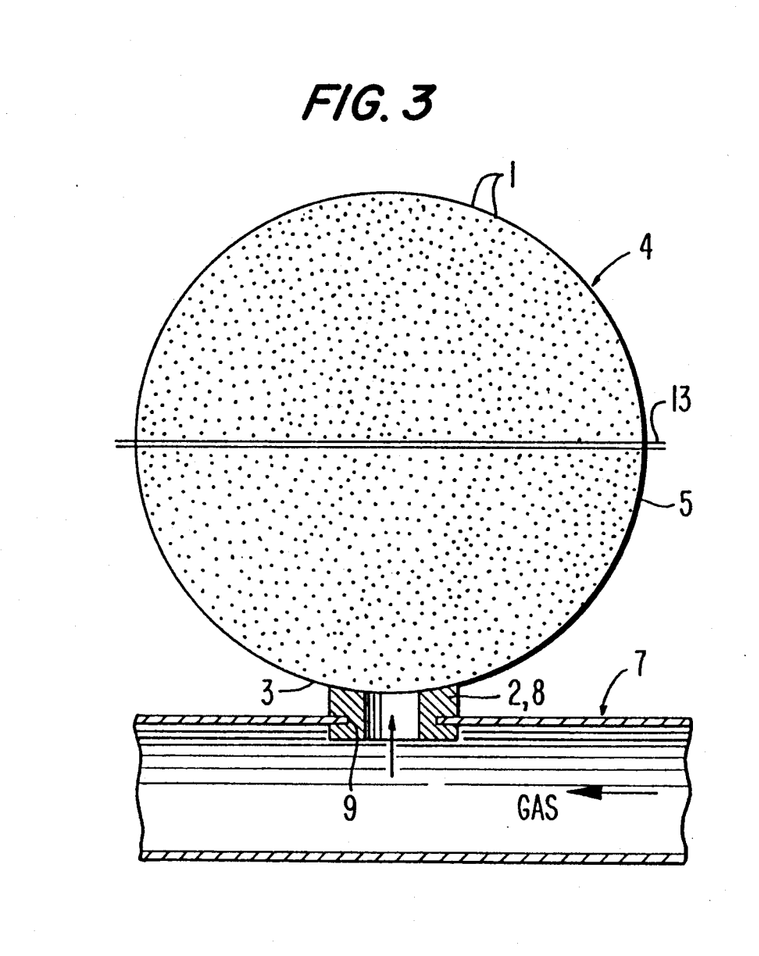

The major distinction between the embodiment of FIG. 3 and that of FIG. 2 is that bubble member 4 is not made in one piece but rather comprises an upper bubble half and a bottom bubble half, which are connected to one another by means of respective ring flanges 13 facing one another. The connection can constitute a vulcanizing, welding, cementing, sewing together, or the like.

Figure 4:
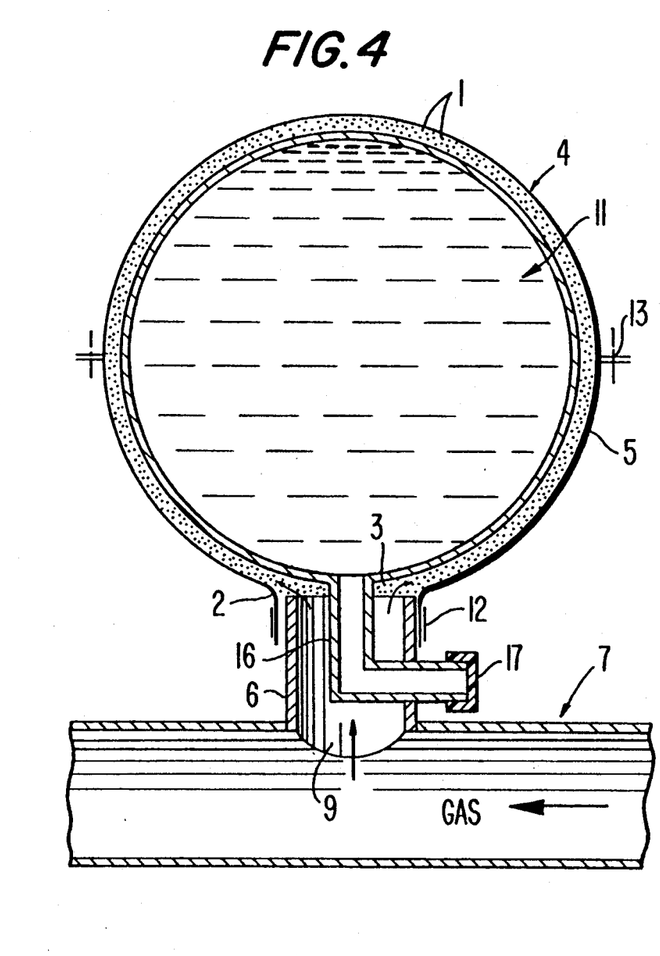

The embodiment shown in FIG. 4 has a bubble member 4 which is similar to that of FIG. 3 and comprises an upper half and a bottom half. However, bubble wall 5 envelops at a distance inwardly a ballast weight 11 which is designed as a hollow body and has an interior that is flow-connected with the liquid surrounding bubble member 4 or that can be filled with a separate liquid or material such as water, cement, lead or the like. In the embodiment shown, ballast weight 11 has been filled with a separate liquid via a bent filler line 16, which is sealed with a cap 17 made of plastic. If there are such ballast weights 11, the gas distributor or gas supply device 7 does not have to be fastened to the bottom of the tank containing the liquid to be gassed.

Figure 5:
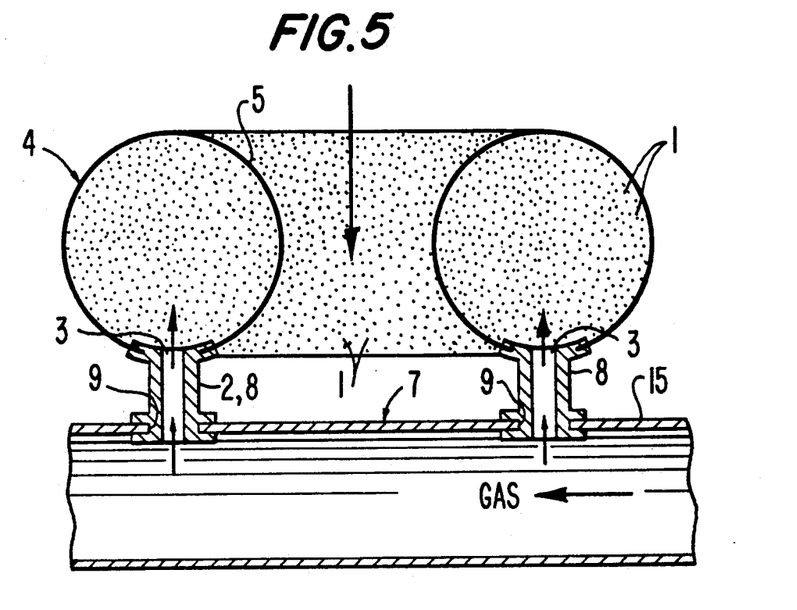

In the embodiment shown in FIG. 5, bubble member 4 is designed torroidally and is fastened to pipe line 15 in the region of two diametrally opposing gas supply openings 3 by means of gas supply fittings 2 designed as beads 8 which can be buttoned or snapped into gas supply openings 9.

Figure 6:
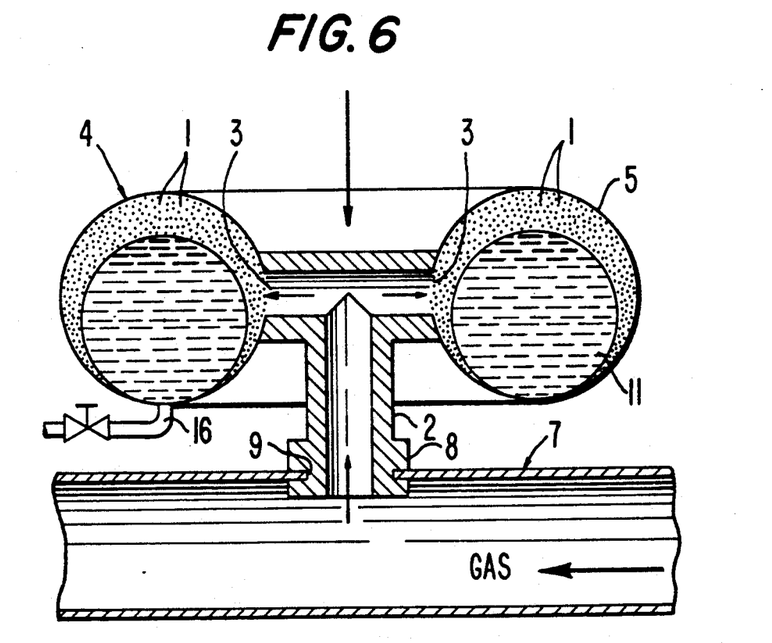

In the embodiment shown in FIG. 6, bubble member 4 is also designed torroidally. However, its interior is flow-connected via a single branching gas supply fitting 2, which on its bottom end is designed again as a bead 8 that can be buttoned or snapped into gas supply opening 9. A second ring-shaped bubble, which has been filled with water via the filler line 16, is located as ballast weight 11 in the ring-shaped bubble member 4.

Figure 7:
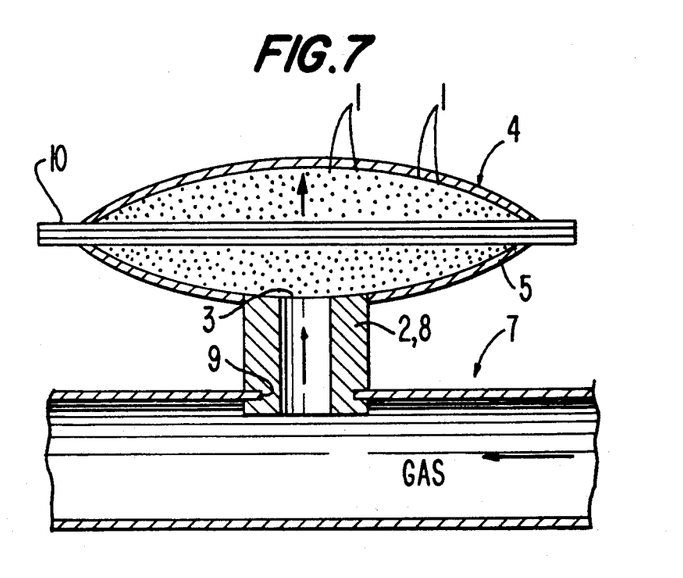

In the embodiment of FIG. 7, bubble member 4 comprises two bubble halves, which are held together in a gas-tight manner at their edges facing one another by means of a ring-shaped shaping element 10. A gas supply fitting 2, which is designed as a bead 8 and is buttoned or snapped with its bottom end into the gas supply opening 9, is again attached in the region of the gas supply opening 3 of the bottom bubble half. Bubble member 4 is shown in a state in which it has not been completely inflated. When inflated, the shaping element 10 rises gradually from its bottom-most position in the direction of the arrow.

Attention is directed to the fact that the embodiments of FIGS. 5 and 6 are particularly advantageous in that they achieve an even greater efficiency of aeration of the liquid. Particularly, the discharge of gas bubbles through the discharge openings 1 in substantially the entire surface of wall 5 results in a downward flow of liquid through the center of the torroidal bubble member 4. This is indicated in FIGS. 5 and 6 by the vertically downwardly directed arrows therein. This downward flow of liquid creates improved exchange between the upwardly rising gas bubbles and the downwardly flowing liquid. The exact reason for the downward flow of liquid is not entirely understood. However, it has been observed that the upward flow of bubbles from the torroidal-shaped bubble member 4, when the gas is discharged over substantially the entire area of wall 5, expands upwardly and outwardly. In other words, the cross section of the area of rising bubbles increases upwardly. This contrasts with the spherical shape of FIGS. 1–4 wherein the upward flow of bubbles tends to contract upwardly. It is believed that this distinction causes or is caused by conditions that create the downward flow of liquid centrally through the torroidal-shaped bubble member 4. It is to be understood that it is not intended to limit the present invention to the above explanation. The fact is however that the indicated downward flow of liquid does occur, and also improved efficiency of aeration of the liquid (i.e. greater gas-liquid exchange) does occur.

FIGS. 8–15 illustrate modifications of this feature of the present invention, i.e. of the embodiments of FIGS. 5 and 6, wherein there are achieved a downward liquid flow and an improved liquid aeration. However, the assemblies of FIGS. 8–15 have the advantage of being more easily constructed than the embodiments of FIGS. 5 and 6. In the embodiments of FIGS. 8–15, the bubble member is in the form of a membrane-like cylindrical wall disposed with the axis thereof extending vertically. As such, there is provided the advantage that the gas bubbles leave the bubble member throughout the entire cylindrical outer surface of the membrane-like wall in directions horizontally. As a result, the period of dwell of the gas bubbles in the liquid is increased, and consequently the gassing effect is increased compared with gas bubbles leaving an inclined surface or gas bubbles leaving a horizontal surface in directions upwardly. Furthermore, the embodiments of FIGS. 8–15 define an inner vertically extending liquid channel or channels through which is obtained an increased downward flow of liquid. The reason for this appears to be that the liquid around the outer surface of the membrane-like cylindrical wall member has a higher concentration of gas bubbles than the liquid within the inner vertical channel. Therefore, it appears that the specific gravity of the liquid around the device is less than that of the liquid within the inner vertical channel. This leads to the effect that the liquid around the device flows upwardly whereas the liquid in the middle of the device flows downwardly. As a result, an enhanced circulation is achieved, and therefore there also is obtained an increased gassing effect.

Figure 8:
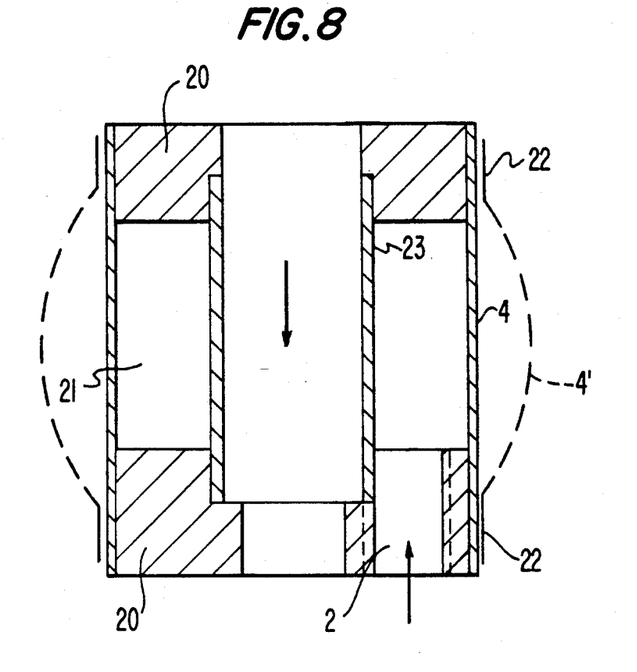
FIGS. 8-10 are partial sectional views of still further embodiments of the invention, FIG. 10 being a section along line 10—10 in FIG. 11.

With regard to FIG. 8, there is disclosed a bubble assembly including a body member 20 having therein a gas chamber 21. Body member 20 defines gas supply fitting 2, in the illustrated arrangement in the form of an internally threaded bore adapted to mate with an external thread provided on gas supply device 7. It is contemplated that body member 20 be cylindrically shaped. Bubble member 4 is in the shape of a cylindrical tube and is mounted at opposite axial ends thereof to the exterior of body member 20, for example by means of clamps 22. Thus, air is introduced through gas supply fitting 2 into gas chamber 21 and expands bubble member 4 outwardly as shown at 4'. The wall of bubble member 4 is constructed to have therethrough gas discharge openings arranged in the manner discussed above with regard to the embodiments of FIGS. 1-7. That is, the openings are distributed and/or constructed in the various manners discussed above. Extending substantially vertically through body member 20 is a liquid channel 23. In the illustrated embodiment, channel 23 is defined by a tubular member connected at opposite axial ends thereof to the body member 20. The tubular member may be rigid or may be of a flexible material, as long as the flexibility of the tubular member is less than the flexibility of bubble member 4. As illustrated by the downwardly directed arrow, a flow of liquid is created downwardly through liquid channel 23, in a manner similar to that described above regarding the embodiments of FIGS. 5 and 6.

Figure 9:
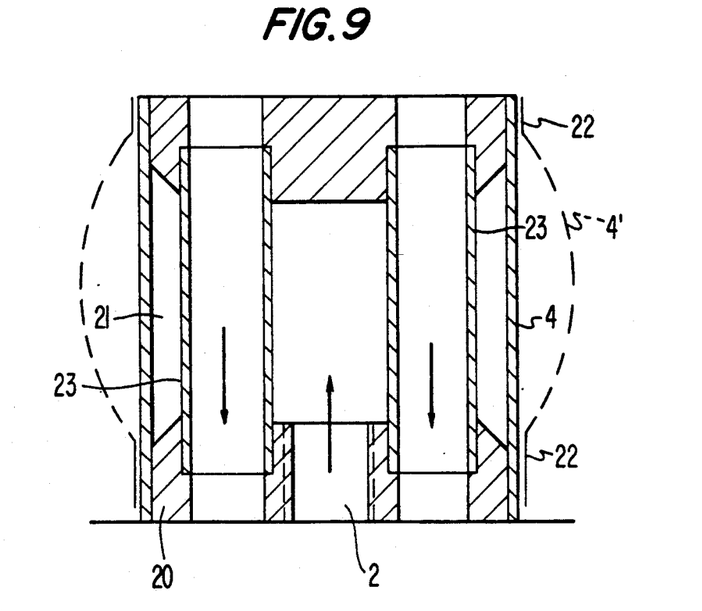

FIG. 9 illustrates a modification of the arrangement of FIG. 8. Thus, in the embodiment of FIG. 8, the liquid channel 23 is positioned coaxially of body member 20, and gas supply fitting 2 is located offset from the vertical axis of body member 20. However, in the embodiment of FIG. 9 this relationship is reversed. Thus, in FIG. 9 the gas supply fitting 2 is located coaxially centrally of body member 20 and opens directly into gas chamber 21. A plurality of liquid channels 23 extend through body member 20 and gas chamber 21 and are located offset from the axial center thereof. There is created a downward flow of liquid through each of the liquid channels 23. Otherwise, the embodiment of FIG. 9 operates in the same manner as the embodiment of FIG. 8.

Figure 10:
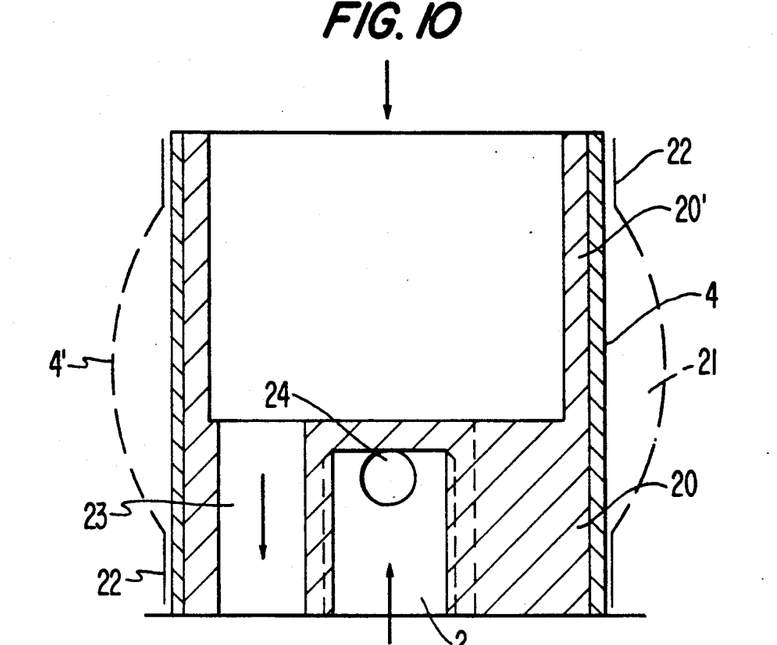
Figure 11:
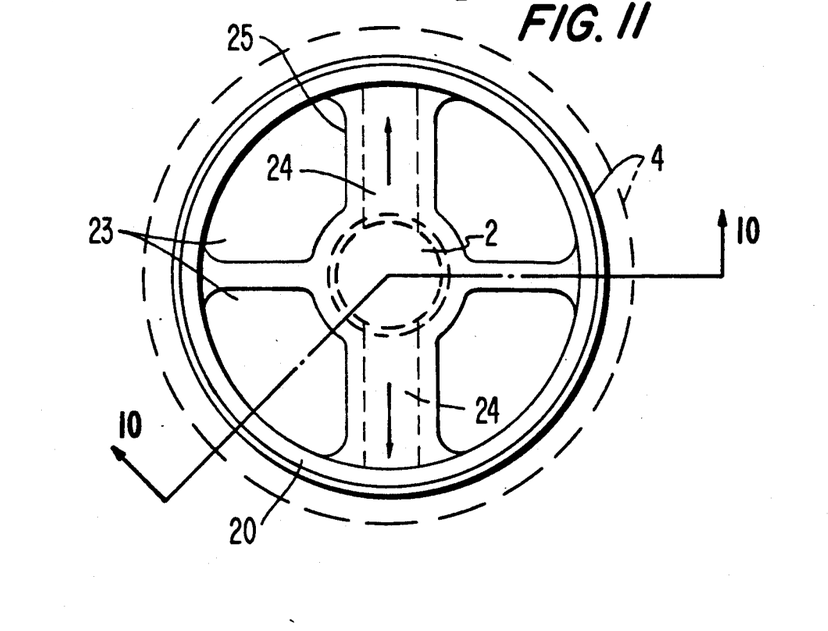
FIG. 11 is an end view as seen from the top of FIG. 10.

With reference to FIGS. 10 and 11, the bubble member 4 fits substantially flush against the outer periphery of the body member 20 when gas is not introduced. This arrangement however could of course involve a slight inset for formation of chamber 21. When the bubble member is expanded outwardly as shown at 4', then chamber 21 of course is expanded. The gas supply fitting 2 opens coaxially centrally of body member 20 and is connected to chamber 21 by a plurality of air passages 24 extending through webs 25 of body member 20 that define through a portion of the length thereof a plurality of liquid channels 23. Thus, the air enters fitting 2 upwardly as indicated by the arrow in FIG. 10 and then passes through passages 24 radially horizontally outwardly as shown by the arrows in FIG. 11, and then passes into chamber 21 to expand bubble member 4 outwardly. A downward flow of liquid is created as indicated by the arrows in FIG. 10 to pass through the plurality of liquid channels 23.

Figure 12:
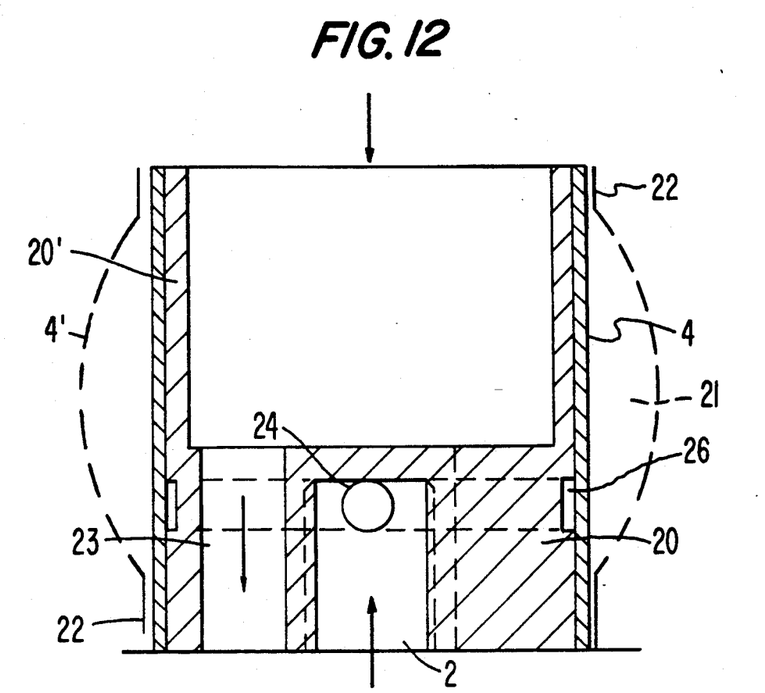
FIGS. 12 and 13 and FIGS. 14 and 15 are views similar to FIGS. 10 and 11, respectively, but illustrating additional embodiments of the present invention.
Figure 13:
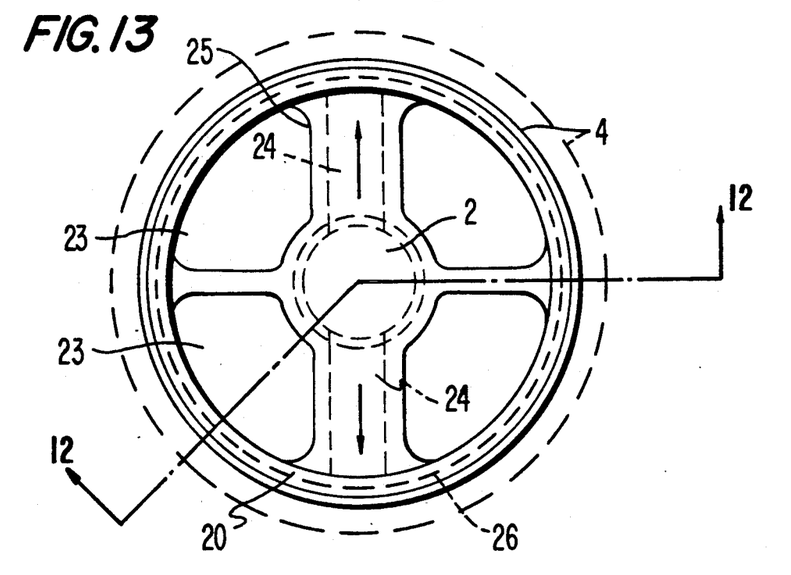

FIGS. 12 and 13 illustrate an embodiment similar to the embodiment of FIGS. 10 and 11. However, in the embodiment of FIGS. 12 and 13 the body member is provided with an outer circumferential annular groove 26 into which open the outer ends of gas or air passages 24. Thus, the groove 26 provides the advantage that the air or gas is supplied to the air chamber and to the inner surface of bubble member 4 circumferentially of the body member. This contrasts to the arrangement of the embodiment of FIGS. 10 and 11 wherein the air or gas is supplied to the gas chamber and to the inner surface of the bubble member 4, at least initially, at only two points corresponding to the radially outer ends of passages 24. In this embodiment, the bubble member or membrane-like wall 4 preferably should not be provided with gas discharge openings 1 in the area adjacent and confronting groove 26. Thereby, a good gas distribution is obtained within gas chamber 21.

Figure 14:
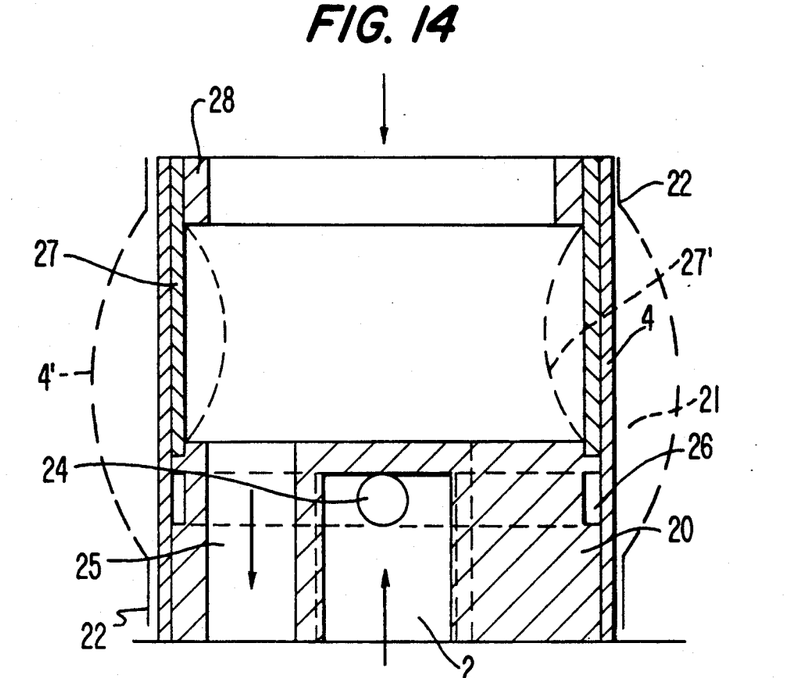
Figure 15:
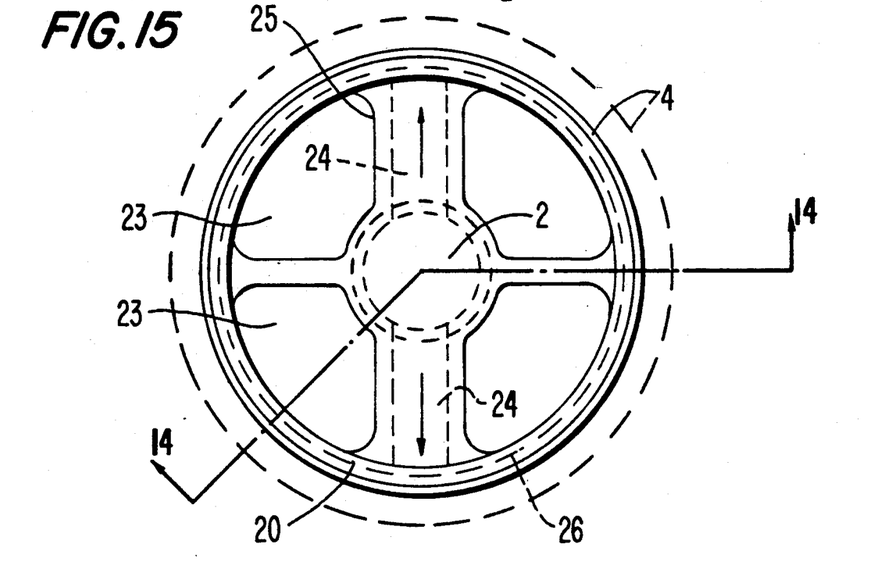

FIGS. 14 and 15 illustrate an even further modification of this arrangement of the present invention. Thus, in the embodiment of FIGS. 10-13, an upper portion 20' of body member 20 is formed of rigid material. However, in the embodiment of FIGS. 14 and 15, this rigid wall section 20' of the body member is replaced by an additional tubular flexible membrane-like wall member 27 having therethrough a plurality of gas discharge openings constructed in any of the various manners discussed above regarding the previous embodiments. For example, a lower axial end of wall member 27 is connected to body member 20. An upper end of wall member 27 may be clamped to an upper end of wall member 4, for example between clamp 22 and an inner clamp member 28 that may be a portion of or connected to body member 20. When gas is supplied to passages 24 and into gas chamber 21, initially the wall member 4 will expand outwardly as shown at 4'. Then the inner wall member 27 will expand inwardly as indicated at 27'. As shown in FIGS. 14 and 15, groove 26 also may be provided in this embodiment. The expansion of wall member 27 inwardly into the liquid channel of the bubble assembly further improves downward flow of liquid in liquid channel 23.

Preferably the liquid channel or channels 23 in the embodiments of FIGS. 8-15 extend parallel to the bubble member 4.

Although the present invention has been described and illustrated with respect to preferred features thereof, it is to be understood that various changes and modifications may be made to the specifically described and illustrated features without departing from the scope of the present invention.

I claim:

1. A gas distribution device for gassing a liquid by being positioned beneath the level of the liquid and connected to a gas supply source, said device comprising:

a bubble assembly including a body member having a gas chamber, and a membrane-like wall formed of a flexible material and defining a bubble member mounted on said body member such that said bubble member defines an outer periphery of said gas chamber;

gas supply fitting means connected to said gas chamber of said body member of said bubble assembly for mounting said bubble assembly to the gas supply source such that gas from the gas supply source may be fed through said gas supply fitting means into said gas chamber;

said wall defining said bubble member having therethrough a plurality of gas discharge openings, such that when gas is supplied into said gas chamber at a pressure sufficient to overcome the pressure of the liquid, then the gas is discharged through said gas discharge openings and gasses the liquid; and said bubble assembly being shaped annularly and defining at least one liquid channel extending through said body member, whereby as gas is discharged through said gas discharge openings into the liquid, the gas rises through the liquid as bubbles and there is created a downward flow of liquid through said liquid channel.

2. A device as claimed in claim 1, wherein said bubble member is maintained in a predetermined shape by rib-shaped thickened portions.

3. A device as claimed in claim 1, wherein the thickness of said wall defining said bubble member increases from a lower portion of said bubble member to an upper portion thereof as a function of the liquid pressure to be overcome by the gas being discharged through said gas discharge openings.

4. A device as claimed in claim 1, wherein the size of the effective open cross section of said gas discharge openings decreases from a lower portion of said bubble member to an upper portion thereof to thus ensure substantially a uniform volume discharge of gas over the entire exterior of said bubble member.

5. A device as claimed in claim 1, wherein said flexible material is expandable.

6. A device as claimed in claim 1, wherein said flexible material is non-expandable.

7. A device as claimed in claim 1, wherein said flexible material comprises textile material.

8. A device as claimed in claim 1, wherein said flexible material includes a textile reinforcement insert or overlay.

9. A device as claimed in claim 1, wherein said gas discharge openings are inserted through said wall formed of an expandable material with said wall being prestressed.

10. A device as claimed in claim 1, wherein said gas discharge openings are inserted through said wall with said wall being non-prestressed.

11. A device as claimed in claim 1, wherein the opening cross section of said gas discharge openings increases from the interior of said wall to the exterior thereof.

12. A device as claimed in claim 1, wherein said gas supply fitting means has a configuration to fit over a socket of the gas supply source.

13. A device as claimed in claim 1, wherein said gas supply fitting means includes a bead capable of snapping into and over a gas supply opening of the gas supply source.

14. A device as claimed in claim 1, wherein said wall of said bubble member comprises an integral one-piece structure.

15. A device as claimed in claim 1, wherein said wall of said bubble member comprises plural wall segments connected together.

16. A device as claimed in claim 1, further comprising a nonreturn valve to be positioned adjacent said gas supply fitting means.

17. A device as claimed in claim 1, wherein said bubble member is shaped torroidally.

18. A device as claimed in claim 1, wherein said gas discharge openings are distributed substantially uniformly.

19. A device as claimed in claim 1, wherein said gas supply fitting means provides the sole support of said bubble assembly beneath the liquid level.

20. A device as claimed in claim 1, wherein said gas discharge openings are distributed over substantially the entire surface of said bubble member.

21. A device as claimed in claim 20, wherein said gas discharge openings are distributed substantially uniformly.

22. A device as claimed in claim 1, wherein said bubble member assumes a predetermined shape when pressurized internally by gas from the gas supply source.

23. A device as claimed in claim 22, wherein said shape is spherical.

24. A device as claimed in claim 22, wherein said shape is a flattened sphere.

25. A device as claimed in claim 22, wherein said shape is torroidal.

26. A device as claimed in claim 1, further comprising a ballast member positioned within and enveloped by said bubble member, said ballast member being spaced inwardly of said bubble member.

27. A device as claimed in claim 26, wherein said ballast member is hollow and is formed of rigid or flexible material.

28. A device as claimed in claim 27, further comprising means for filling the hollow interior of said ballast member with a ballast material.

29. A device as claimed in claim 27, further comprising means to connect the hollow interior of said ballast member to the liquid to be gassed.

30. A device as claimed in claim 29, further comprising means for filling the hollow interior of said ballast member with a ballast material.

31. A device as claimed in claim 1, wherein said body member is shaped cylindrically, and said bubble member is a flexible cylindrical tube connected at opposite axial ends thereof to said body member, such that as gas is introduced through said gas supply fitting means into said gas chamber said bubble member is expanded outwardly of said body member from said opposite axial ends.

32. A device as claimed in claim 31, wherein said liquid channel extends parallel to said bubble member.

33. A device as claimed in claim 31, comprising a single said liquid channel positioned coaxially inwardly of said bubble member.

34. A device as claimed in claim 31, comprising plural said liquid channels extending through said body member.

35. A device as claimed in claim 31, wherein said liquid channel is defined by the material of said body member.

36. A device as claimed in claim 31, wherein said liquid channel is defined by a tubular member passing through said gas chamber and connected to said body member.

37. A device as claimed in claim 36, wherein said tubular member is formed of a material having a flexibility less than that of said flexible material of said bubble member.

38. A device as claimed in claim 31, wherein an upper portion of said body member comprises a tubular flexible membrane-like wall member positioned radially inwardly of said bubble member and expansible radially inwardly thereof into said liquid channel upon gas being introduced into said gas chamber.

39. A device as claimed in claim 38, wherein said wall member has therethrough a plurality of gas discharge openings.

40. A device as claimed in claim 31, wherein said gas supply fitting means is formed in said body member.

41. A device as claimed in claim 40, wherein said gas supply fitting means is positioned coaxially centrally of said body member, and said liquid channel extends non-centrally of said body member.

42. A device as claimed in claim 41, wherein said gas supply fitting means is connected directly to said gas chamber.

43. A device as claimed in claim 41, wherein said body member has therein at least one connecting passage connecting said gas supply fitting means to said gas chamber.

44. A device as claimed in claim 43, further comprising an annular groove formed in an outer surface of said body member, and wherein said connecting passage opens outwardly into said annular groove.

45. A device as claimed in claim 43, comprising plural said connecting passages.

46. A device as claimed in claim 43, wherein said connecting passage extends radially of said body member.

47. A device as claimed in claim 46, further comprising an annular groove formed in an outer surface of said body member, and wherein said connecting passage opens outwardly into said annular groove.

* * * * *